United States Patent
Leyh et al.

(10) Patent No.: US 9,124,336 B2
(45) Date of Patent: Sep. 1, 2015

(54) INTERFERENCE MITIGATION IN A COMMUNICATION SYSTEM

(71) Applicant: Fraunhofer-Gesellschaft zur Foerderung der angewandten Forschung e.V., Munich (DE)

(72) Inventors: Martin Leyh, Erlangen (DE); Aharon Vargas Barroso, Erlangen (DE); Michael Schlict, Seligenporten (DE); Frank Mayer, Baiersdorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/471,202

(22) Filed: Aug. 28, 2014

(65) Prior Publication Data

US 2014/0369450 A1   Dec. 18, 2014

Related U.S. Application Data

(63) Continuation of application No. PCT/EP2013/053450, filed on Feb. 21, 2013.

(30) Foreign Application Priority Data

Feb. 29, 2012   (EP) .................................. 12157427

(51) Int. Cl.
  *H04L 25/08*  (2006.01)
  *H04B 1/10*  (2006.01)
  *H04L 25/03*  (2006.01)

(52) U.S. Cl.
  CPC .............. *H04B 1/109* (2013.01); *H04B 1/1027* (2013.01); *H04L 25/03178* (2013.01)

(58) Field of Classification Search
  CPC .. H04L 27/2647; H04B 1/1027; H04B 1/109; H04B 7/15585; H04B 1/1036

USPC .......... 375/346, 214, 267, 335; 370/278, 328, 370/342

See application file for complete search history.

(56) References Cited

U.S. PATENT DOCUMENTS

| | | |
|---|---|---|
| 2005/0095985 A1 | 5/2005 | Hafeoz |
| 2007/0049231 A1 | 3/2007 | Kemenczy et al. |

(Continued)

FOREIGN PATENT DOCUMENTS

| | | |
|---|---|---|
| EP | 1 492 288 A2 | 12/2004 |
| EP | 2 083 517 A1 | 7/2009 |

(Continued)

OTHER PUBLICATIONS

Official Communication issued in International Patent Application No. PCT/EP2013/053450, mailed on Sep. 9, 2013.

*Primary Examiner* — Khai Tran
(74) *Attorney, Agent, or Firm* — Keating & Bennett, LLP

(57) ABSTRACT

A receiver has an input for an incoming signal, the incoming signal possibly having a wanted signal and one or more interference signals. The receiver further has a signal source for providing a predetermined signal that is substantially identical to at least a portion of at least one interference signal of the one or more interference signals. The receiver also has a signal analyzer for analyzing the incoming signal regarding at least one known signal component of at least one of the one or more interference signals to obtain at least one interference signal parameter. A cancellation signal generator generates a cancellation signal on the basis of the at least one interference signal parameter. The receiver further has an interference canceller for at least partially cancelling the at least one interference signal by applying the cancellation signal to the incoming signal. A corresponding transmitter and a method for interference cancellation are also disclosed.

23 Claims, 12 Drawing Sheets

(56) References Cited

U.S. PATENT DOCUMENTS

2007/0116099 A1* 5/2007 Banister .................. 375/148
2010/0118922 A1* 5/2010 Ahn ........................ 375/214
2011/0218007 A1* 9/2011 Kimura .................... 455/512

FOREIGN PATENT DOCUMENTS

| WO | 2006/068635 A2 | 6/2006 |
| WO | 2006/073893 A2 | 7/2006 |

* cited by examiner

INTERFERENCE MITIGATION IN A COMMUNICATION SYSTEM

CROSS-REFERENCE TO RELATED APPLICATIONS

This application is a continuation of copending International Application No. PCT/EP2013/053450, filed Feb. 21, 2013, which is incorporated herein by reference in its entirety, and additionally claims priority from European Application No. 12157427.1, filed Feb. 29, 2012, which is also incorporated herein by reference in its entirety.

BACKGROUND OF THE INVENTION

Embodiments of the present invention relate to a receiver. Some embodiments relate to a method for interference cancellation. Some embodiments relate to an interference mitigation using known sequences.

In digital communication systems, where communication shall be performed over a large coverage area a cell structure is usually employed. Several transmitters can be deployed, where each covers a certain area, creating a cell structure. In satellite communications, this structure can be achieved by employing different beams at the satellite (multi-spot-beam architecture).

Besides receiving the useful signal, a receiver may also be interfered by cells or beams using the same frequency, the so-called co-channel interference (CCI), e.g., in a frequency reuse scheme as exemplified in FIG. 1. The straight forward approach to avoid CCI is to use a different frequency in each beam, which eliminates any CCI between the beams. However, this incurs a waste of frequency spectrum, because a given frequency is only used in a small region of the whole coverage area. In contrast, if the same frequency is used for all the cells, the received signal can be degraded by the strong CCIs coming from the nearest beams. A compromise can be achieved assuming a frequency re-use technique based on M different frequencies. FIG. 1 shows an example, where three different frequencies (M=3) are used to cover the whole area. Note that in the example six other beams (hatched) are transmitting at the same frequency as the wanted beam (cross hatched). In this case the CCI received in the wanted beam is relatively weak, because the cells using the same frequency are not adjacent to the considered cell. Usually, the total power of the received CCIs is much lower than the received noise, meaning that the interference effect can be neglected. However, in a dense cell layout the interference contribution may dominate (interference-limited system). In this case, it is of interest to mitigate or even cancel the CCIs coming from the beams using the same frequency (hatched beams).

Assuming a system which is not working at 100% of its capacity, there will be time periods where no useful data are being transmitted in a beam. One possible technique is to switch off one beam when no transmission is necessitated. In this case, the beam does not interfere with other beams using the same frequency. However, this technique is not suitable for some communication systems, as for example, satellite communications, where the transponders of the satellite cannot be switched off and on continuously.

The relevance of interference mitigation is closely related to the noise level. In many communication systems, the noise level is much higher than the CCIs generated by the own communication system (noise-limited system). In these cases, the interferences are hidden by the noise and their effect can be neglected, hence, interference mitigation/cancellation techniques are not increasing the performance of noise-limited communication systems. However, two developments have made interference a more critical issue in recent communication systems: a) more efficient antennas and data processing algorithms have lowered the amount of noise seen by a receiver, b) the necessity of saving bandwidth has conducted the communication systems to re-use frequencies, increasing the interference level generated by the own communication system. These two reasons produce that some communication systems can be limited by the interference level and not anymore by the noise level (interference-limited systems). For example, in current Ka-band satellite systems with narrow multi-spot beam layout the performance is limited by interference, not noise (assuming that sufficient power is transmitted by satellites).

With increased interference levels interference cancelation is becoming more relevant in modern communication schemes. A lot of research effort has been conducted in cancelling the interferences at the receiver side. A typical research field for interference cancellation techniques involves the use of MIMO systems as depicted in FIG. 2. In this case, the receiver has multiple antennas to receive different versions of the transmitted signals. Interference cancellation is achieved by using a weight matrix to maximize the received signal from each antenna (Gollakota et al, "Interference Alignment and Cancellation", SIGCOMM'09, Aug. 17-21, 2009, Barcelona, Spain).

European patent application EP 1802000 ("Apparatus and Method for Cancelling Interference from Neighbor Cells in Broadband Communication System") is related to MIMO interference cancellation and discloses a communication system with at least two receiver antennas. A classical zero forcing equalization is done at I,Q level at the receiver, where the channel parameters are estimated by a channel estimation block.

Note that this technique is only applicable in MIMO communication systems, where a certain de-correlation between the received signals can be achieved. However, for some communication channels, as satellite channels, a de-correlation between the received signals can be only achieved if the antennas are well separated (order of kilometers), which is not practical for many scenarios.

A different technique to mitigate the interferences is to pre-compensate the effect of the channel at the transmitter, before the information is sent. This technique is called pre-coding, where the transmitter necessitates information about the channel (Channel State information) which can be sent back from the receivers to the transmitter. A typical communication scheme is shown in FIG. 3. Zero-forcing pre-coding (see, for example, A. Wiesel et al., "ZeroForcing Precoding and Generalized Inverses", IEEE Transactions on Signal Processing, Vol. 56, No. 9, September 2008) or non-linear THP (Tomlinson-Harashima Pre-coding) (see, for example, M. A. Diaz et al., "Non-linear Interference Mitigation for Broadband Multimedia Satellite Systems", in Proceedings International Workshop on Satellite and Space Communications (IWSSC), pp. 61-65, Salzburg, Austria, September 2007) are currently two common techniques to mitigate interferences.

United States Patent Application Publication No. US 2009/239472 ("Apparatus and Method for Removing Interference in Multiple Antenna System") discloses a communication system where the transmitter receives a channel estimation from each receiver. Based on these parameters, the transmitter uses beamforming (applying a pre-coding technique) to mitigate the radiation of interferences.

Although pre-coding techniques are very promising, they demand an important prerequisite: a transmitter involves applying the pre-coding to all the data which will be sent to the different beams working at the same frequency. For some scenarios, the beams using the same frequency are managed by different transmitters, hindering the use of pre-coding techniques. One example of that is shown in FIG. 4, where only some gateways are plotted. In this case, the transmitted data to beams using the same frequency cannot be jointly processed before the transmission because the transmitters have no knowledge about the data of the other transmitters. Therefore, pre-coding cannot be applied.

In general, interference cancellation can be achieved by subtracting the interference signal from the received signal. The interference signal has to be known in order to perform the subtraction. In wired communications using the same cable to perform transmissions in both directions, the interference introduced by the transmitted signal is known and it can be subtracted from the received signal. U.S. Pat. No. 7,706,434 ("Method and Apparatus for Cancelling Interference in a Communication System") deals with this problem. U.S. Pat. No. 7,706,434 discloses a wired bidirectional communication, where the interference introduced by the transmitter signal is known a-priori and can be subtracted from the received signal to improve the received SNR (Signal-to-Noise Ratio). The process is performed in the analog domain, where the known interference is generated in digital domain and then passed through a DAC (Digital-to-Analog Converter) and subtracted from the analog received signal.

United States Patent Application Publication No. US 2005/0095985 A1 discloses a method and apparatus for multi-used interference determination and rejection that is based on generating and evaluating one or more hypothesized interferers.

WO 2006/073893 A2 describes an adaptive beam forming with multi-user detection and interference reduction in satellite communication systems and methods.

EP 1 492 288 A2 describes a multiuser detection for wireless communication systems in the presence of interference.

United States Patent Application Publication No. US 2007/0049231 A1 discloses a joint demodulation filter for co-channel interference reduction and related methods.

In wireless systems, where many users are considered, different frequencies can be used for each user. However, in modern communication systems, the same frequency is employed for different users in order to increase the data transmission. This scenario is known as multiuser detection (MUD) (S. Wang et al., "Toward Forward Link Interference Cancellation", San Francisco, Calif.: CDMA Development Group Technology Forum), also referred to as jointdetection. A typical example is Code Division Multiple Access (CDMA) where different users share the same frequency, but are encoded using different sequences. Then, the information of all users is added and transmitted. Therefore, the contribution of each user can be seen as interference when decoding a given user. As each user is "marked" using different scrambling sequences, they can be separated at the receiver using appropriate correlators. Once that one user has been decoded, this information can be subtracted from the received stream to remove one interference source, which could help in the decoding of the other users. International Patent Application WO 02/39597 A2 ("Method and Apparatus for Interference Cancellation in a Communication System") discloses a communication system which uses CDMA and a plurality of correlators to estimate the channel for each user based on transmitted pilots. The estimation is used to decode each user, and the decoded information is re-encoded and subtracted from the original received signal. A second decoding step is done after the interference cancellation is performed. This interference cancellation scheme relies on the assumption that at least one of the users may be decoded without any interference cancellation beforehand, an assumption that may be reasonable for CDMA where one user often dominates the other users. Even if the receiver actually wants to receive one of the weaker users the interference cancellation scheme proposed in WO 02/39597 A2 may then be useful. However, the interference cancellation scheme proposed in WO 02/39597 A2 is likely to reach its limits when, for example, the wanted signal is already the strongest signal but the interfering signals are still quite strong (or when the interfering signal(s) and the wanted signal have roughly the same strength) and thus prevent proper decoding of the wanted signal. The attempt to decode the interfering signals is likely bound to fail, because of the strong wanted signal. This situation is often encountered in satellite communication, general broadcasting, and similar communication systems.

Therefore, it is an object of the present invention to provide a concept for interference mitigation and/or cancellation in communication systems where the interfering signal(s) does not necessarily have to be reliably decodable and/or where real-time information about transmission conditions cannot, or only to a limited degree, be exchanged between the receiver(s), the transmitter(s), and among the receivers and/or transmitters.

SUMMARY

According to an embodiment, a receiver may have: an input for an incoming signal, the incoming signal possibly having a wanted signal and one or more interference signals, wherein the one or more interference signals contain one or more predetermined signal at least occasionally; an interference parameter provider for providing interference signal parameters regarding at least one known signal component of at least one of the one or more interference signals; a cancellation signal generator for generating a cancellation signal on the basis of the interference signal parameters; and an interference canceller for at least partially cancelling the one or more interference signals by applying the cancellation signal to the incoming signal; characterized in that the interference canceller is configured to pause during time intervals in which the one or more interference signal contains data that is not a-priori known at the receiver.

Another embodiment may have a communication system having a transmitter and a receiver as mentioned before.

According to another embodiment, a method for interference cancellation at a receiver may have the steps of: receiving an incoming signal, the incoming signal possibly having a wanted signal and one or more interference signals, wherein the one or more interference signals contain one or more predetermined signal at least occasionally; obtaining at least one interference signal parameter regarding at least one known signal component of at least one of the one or more interference signals; generating a cancellation signal on the basis of the at least one interference signal parameter; and cancelling at least partially the one or more interference signals by applying the cancellation signal to the incoming signal; characterized in that cancelling the one or more interference signals pauses during time intervals in which the one or more interference signal contains data that is not a-priori known at the receiver.

Embodiments according to an aspect of the present invention provide a receiver, which comprises an input for an incoming signal, an interference parameter provider, a cancellation signal generator, and an interference canceller. The incoming signal possibly comprises a wanted signal and one or more interference signals. The interference parameter provider is configured to provide at least one interference signal parameter regarding at least one known signal component of at least one of the one or more interference signals. The cancellation signal generator is configured for generating a cancellation signal on the basis of the at least one interference signal parameter. The interference canceller is configured for at least partially cancelling the at least one interference signal by applying the cancellation signal to the incoming signal.

Embodiments according to another aspect of the present invention provide a communication system, transmission system, or broadcasting system comprising a transmitter and a receiver as described above. The transmitter of the communication/transmission/broadcasting system may comprise an input for payload data, a data source for providing a predetermined data sequence, a selector switch a transmit chain connected to the selector switch output, and a switch controller. The selector switch may be configured for selecting one of the payload data and the predetermined data sequence to be provided at a selector switch output. The switch controller may be configured for controlling the selector switch to provide the predetermined data sequence at the selector switch output when no new payload data are available. The predetermined data sequence can optionally comprise an identification of the transmitter. The receiver of the transmission system comprises an input for an incoming signal, an interference parameter provider, a cancellation signal generator, and an interference canceller. The incoming signal possibly comprises a wanted signal and one or more interference signals. The interference parameter provider is configured to provide at least one interference signal parameter and may comprise a signal source and an interference signal correlator. The signal source may be configured for providing a predetermined signal that is substantially identical to at least a portion of at least one interference signal of the one or more interference signals. The interference signal correlator may be configured for performing a correlation of the incoming signal with the predetermined signal and for determining interference signal parameters of the at least one interference signal based on the correlation. The cancellation signal generator is configured for generating a cancellation signal on the basis of the predetermined signal and/or the interference signal parameters. The interference canceller is configured for at least partially cancelling the at least one interference signal by applying the cancellation signal to the incoming signal.

The communication system, transmission system, or broadcasting system may further comprise further transmitters. At a given time, the receiver may be associated with one of the transmitters in order to receive the (payload) signal emitted by this transmitter as the wanted signal. The other transmitters possibly act as interfering transmitters for this communication. The receiver may cancel the interference signals produced by the interfering transmitters according to embodiments.

Embodiments according to a further aspect of the present invention provide a method for interference cancellation at a receiver. The method comprises receiving an incoming signal, the incoming signal possibly comprising a wanted signal and one or more interference signals. The method further comprises obtaining at least one interference signal parameter regarding at least one known signal component of at least one of the one or more interference signals. The at least one interference signal parameter may be obtained by providing a predetermined signal that is substantially identical to at least a portion of at least one interference signal of the one or more interference signals, and by performing a correlation of the incoming signal with the predetermined signal and determining interference signal parameters of the at least one interference signal based on the correlation. Furthermore, the method comprises generating a cancellation signal on the basis of the predetermined signal and the interference signal parameters. The method also comprises cancelling at least partially the at least one interference signal by applying the cancellation signal to the incoming signal.

Further embodiments of the present invention provide a computer program having a program code for performing, when running on a computer or microprocessor, the method for interference cancellation. As stated above, the method for interference cancellation comprises receiving an incoming signal, the incoming signal possibly comprising a wanted signal and one or more interference signals. The method further comprises providing a predetermined signal that is substantially identical to at least a portion of at least one interference signal of the one or more interference signals. The method further comprises performing a correlation of the incoming signal with the predetermined signal and determining interference signal parameters of the at least one interference signal based on the correlation. Furthermore, the method comprises generating a cancellation signal on the basis of the predetermined signal and the interference signal parameters. The method also comprises cancelling at least partially the at least one interference signal by applying the cancellation signal to the incoming signal.

In some embodiments of the present invention, it is exploited that many types of data communication schemes (in particular digital data communication) present idle times or inactive times. Furthermore, some data communication schemes provide for a transmission of control data, status data, and/or other non-payload data that is often fixed or predictable. An example for fixed data is a transmitter identifier, a channel identifier, or a known pilot sequence. An example for predictable data is a time stamp or a frame number. These fixed and/or predictable components of the data transmission contrast with the relatively random (highly unpredictable) payload data contained in the transmitted data. The idle/inactive times of the data communication, as well as the fixed and/or predictable components thereof may be used for interference cancellation purposes. A predetermined signal may be inserted at the idle/inactive times to, or is already part of, an overall signal received by the receiver. The predetermined signal is known to the receiver so that the receiver may determine when the predetermined signal begins and what strength it has. With these values and the knowledge of the predetermined signal the receiver may perform the interference cancellation.

In the above mentioned case of satellite communication, dummy data may be inserted to maintain a constant power level for satellite transmission (see "dummy frames" in DVB-S2 waveform, according to the standard ETSI EN 302 307 V1.2.1). An example of a DVB-S2 frame structure is shown in FIG. 5, where known data are marked as hatched fields. When dummy data are sent, the whole sequence for the respective DVB-S2 Physical Layer Frame is known. Other known data sequences in a DVB-S2 frame are the Start of Frame (SOF) field in the Physical Layer (PL) Header and so-called Pilot Fields (PFs) (in case PFs are used).

This invention describes a mechanism to detect and cancel the interference coming from other beams, whenever such another beam is transmitting a known data sequence/signal. This allows reducing spatial and time aggregated co-channel interference and improving the wanted signal.

In the example of DVB-S2, parts of the frame structure (SOF, pilot fields) are fixed and thus known. In addition, dummy data are transmitted in other beams in the time periods where no payload data is available in these other beams. Knowing the frame structure and using deterministic patterns for the dummy data, the method described in this invention can be applied to detect and cancel such interference from the wanted signal.

Besides cancellation of known interfering data sequences, the invention also allows characterization (e.g., relative power level, identification of source, transmission channel properties) of each individually interfering beam. The invention allows carrying out such a measurement in real-time and without modification to the communication system.

In the example of a multi-spot-beam architecture, such information can be used in higher level system management to perform spot-beam network adjustments, i.e., power sizing or coverage optimization algorithms.

One or more correlators may be used to estimate the whole transmitted signal for a certain time interval, as this is known (dummy frame). These frames are used during the periods where no useful payload data are available in a beam and removed at the receiver (where this signal is regarded as an interfering signal) using interference cancellation. Besides, we propose to extract the channel parameters of the interference by comparing the correlation peaks of the wanted signal and the interference signal.

According to further embodiments of the present invention, the switch controller of the transmitter may comprise a payload data detector configured to detect whether new payload data are available at the input for payload data.

The predetermined data sequence may comprise an identification of the transmitter. An identification of different transmitters and/or beams may also be achieved by using different known sequences as dummy frames.

According to further embodiments, the interference parameter provider may comprises a signal analyzer for analyzing the incoming signal regarding the known signal component of the at least one interference to determine the at least one interference signal parameter. Alternatively, the interference parameter provider may comprise a communication interface via which the at least one interference signal parameter may be received from a remote component. The remote component may be located in an intended reception area that is associated with the at least one interference signal. The communication interface may be connectable to a network, a communication link, or alike. The remote component may comprise the signal analyzer mentioned above.

According to further embodiments, the receiver may further comprise a primary correlator for performing a correlation of the incoming signal with pilot signals of the wanted signal and for determining wanted signal parameters of the wanted signal based on the correlation. The wanted signal parameters may be provided to the interference correlator to be used for the correlation of the incoming signal with the predetermined signal.

The cancellation signal generator may comprise a weighting unit for determining and applying weighting parameters for the cancellation signal.

In further embodiments the portion of the at least one interference signal may correspond to predetermined dummy data inserted into the interference signal by an associated interfering transmitter when the interfering transmitter has no payload data to transmit.

The cancellation signal generator may comprise a predictor for predicting the interference signal when a correlation result of the correlation of the incoming signal and the predetermined signal is below a threshold.

According to further embodiments regarding the receiver, the at least one interference signal may have a frame structure comprising a-priori known data fields and varying data fields, where the varying data fields contain alternating payload data and a-priori known interference indicator data. The interference correlator may be configured for using the a-priori known data fields and the a-priori known interference indicator data in the varying data fields for determining the interference signal parameters.

According to further embodiments, the one or more interference signals may contain one or more predetermined signal at least occasionally. The wanted signal may present temporal redundancy for error correcting purposes. The interference canceller may be configured to pause during time intervals in which the one or more interference signal contains data that is not a-priori known at the receiver. The temporal redundancy of the wanted signal may be exploited to restore the wanted signal during the time intervals where the cancellation is paused.

BRIEF DESCRIPTION OF THE DRAWINGS

Embodiments of the present invention are described herein making reference to the appended drawings, in which.

DETAILED DESCRIPTION OF THE INVENTION

Figure 1:
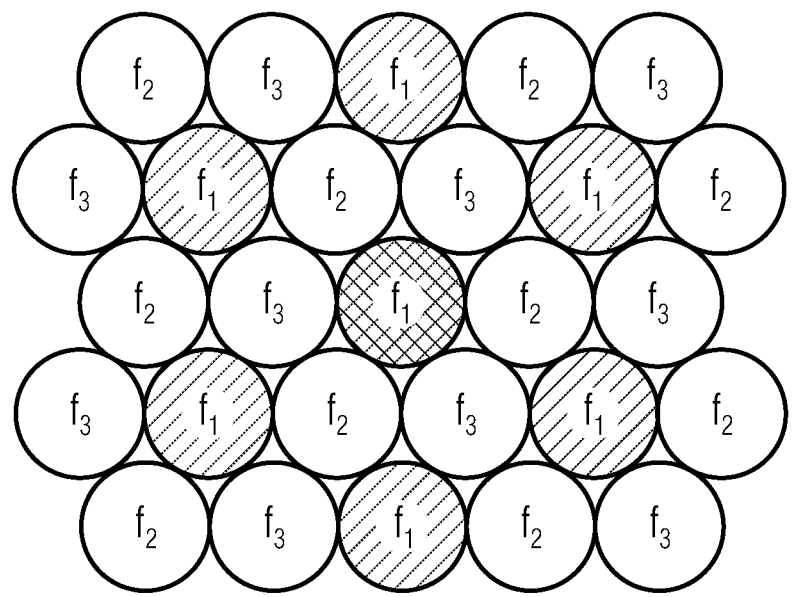
FIG. 1 schematically shows a cell structure of a communication system using three frequencies.
Figure 2:
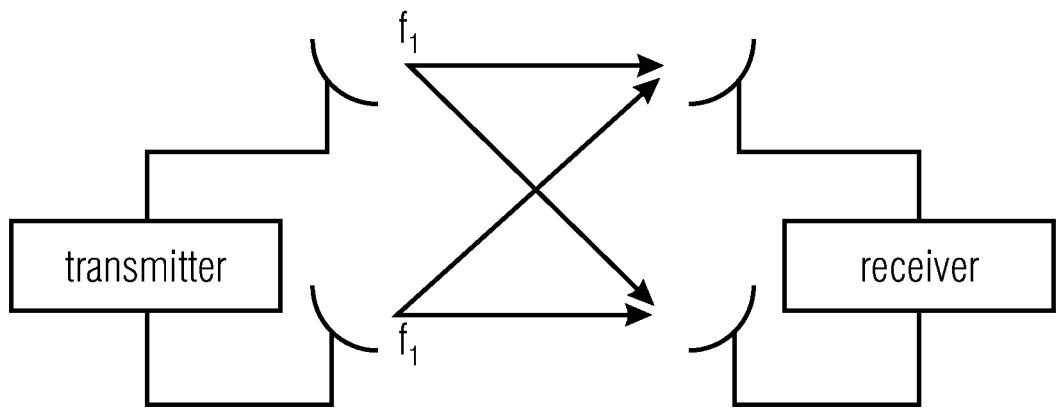
FIG. 2 shows a schematic block diagram of a MIMO system with frequency re-use.
Figure 3:
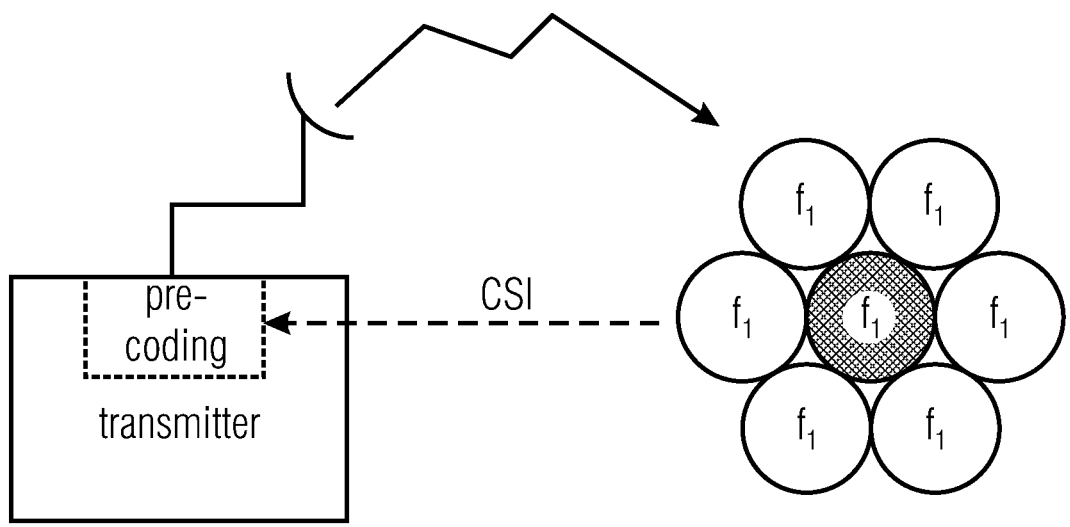
FIG. 3 shows a schematic block diagram of a data transmission system employing pre-coding technique to mitigate interference.
Figure 4:
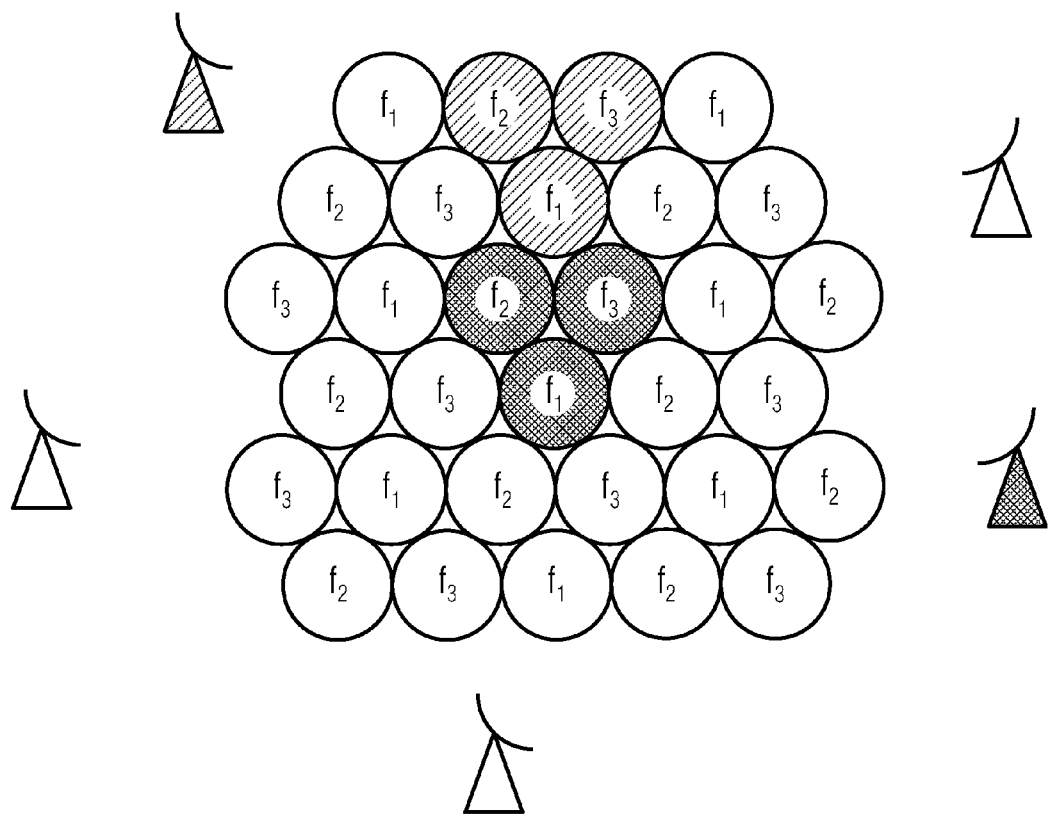
FIG. 4 illustrates a communication scenario where pre-coding cannot be applied.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 5:
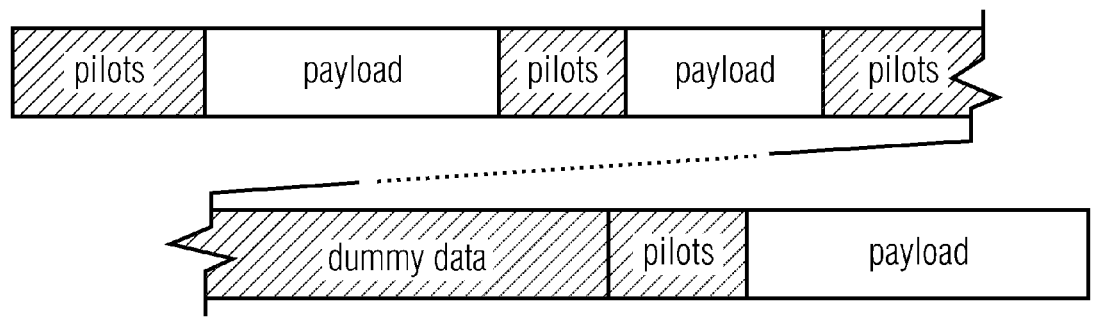
FIG. 5 schematically shows an example of a frame structure of the DVB-S2 (Digital Video Broadcasting—Satellite—Second Generation ETSI EN 302 307 V1.2.1) standard.

FIG. 5 schematically shows a frame structure of a DVB-S2 frame as specified in ETSI EN 302 307 V1.2.1. Assuming a system which is not working at 100% of its capacity, there will be time periods where no useful data are being transmitted in a beam. As stated above, one possible technique is to switch off one beam when no transmission is necessitated. In this case, the beam does not interfere with other beams using the same frequency. However, this technique is not suitable for some communication systems as for example, satellite communication where the transponders of the satellite cannot be switched off and on continuously. In this case, dummy data may be inserted to maintain a constant power level for satellite transmission (see "dummy frames" in DVB-S2 waveform). An example of a DVB-S2 frame structure is shown in FIG. 5, where known data are marked as hatched fields. When dummy data are sent, the whole sequence for the respective DVB-S2 Physical Layer Frame is known. Other known data sequences in a DVB-S2 frame are the Start of Frame (SOF) field in the Physical layer (PL) Header and so-called Pilot Fields (in case PFs are used). Using these known data sequences, the interference coming from other frames can be detected and cancelled which allows reducing spatial and time aggregated co-channel interference and improving the wanted signal. In the example of DVB-S2, parts of the frame structure (SOF, pilot fields) are fixed and thus known. In addition, dummy data is transmitted in other beams in the time periods where no payload data is available in these other beams.

Figure 6:
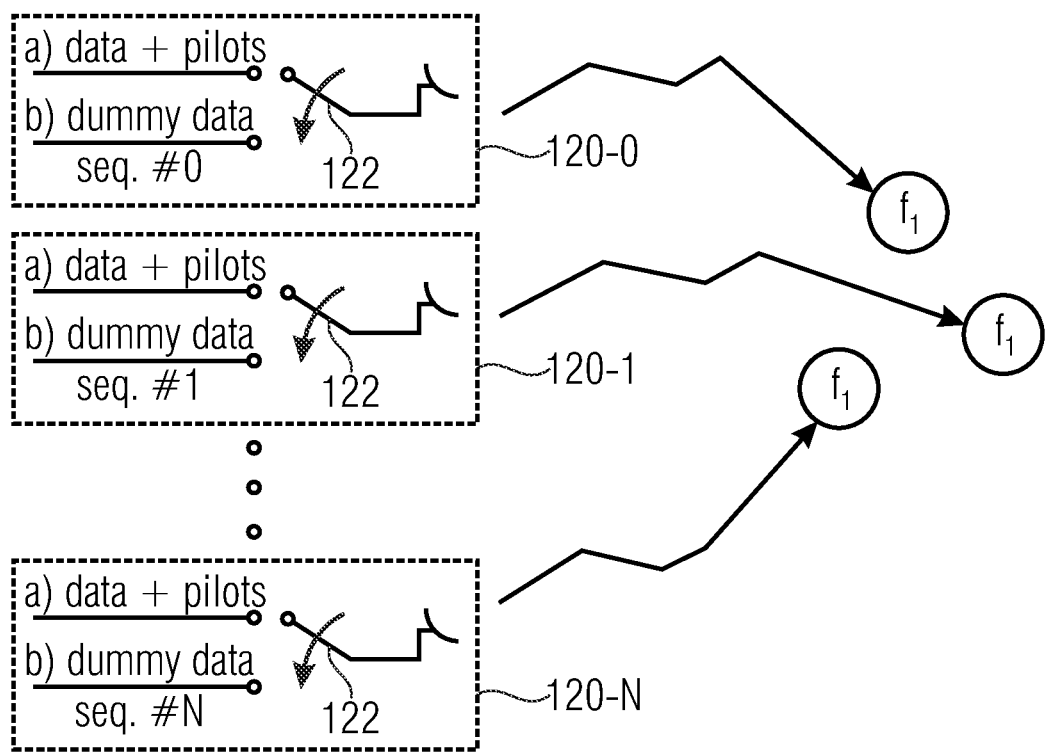
FIG. 6 shows a schematic block diagram of a transmitter structure.

FIG. 6 shows a schematic block diagram of a transmitter structure according to embodiments disclosed herein. N+1 transmitters 120-0, 120-1, . . . 120-N share the same frequency f1 and each transmitter primarily radiates different information to different cells. However, each transmitter typically also (unintentionally) radiates the information to neighboring cells. Each transmitter may operate in at least two different operation modes:

a) If a data communication is taking place in a cell, the corresponding transmitter adds some pilots to the information.

b) If data communication is not necessitated, the transmitter switches to a dummy mode, where a deterministic sequence of dummy data is transmitted.

Therefore, the transmitter is active, either sending useful data (plus pilots) or dummy information. Each transmitter 120-0, 120-1, . . . 120-N comprises a selector switch 122 for switching between a payload data source and a dummy data source.

Figure 7:
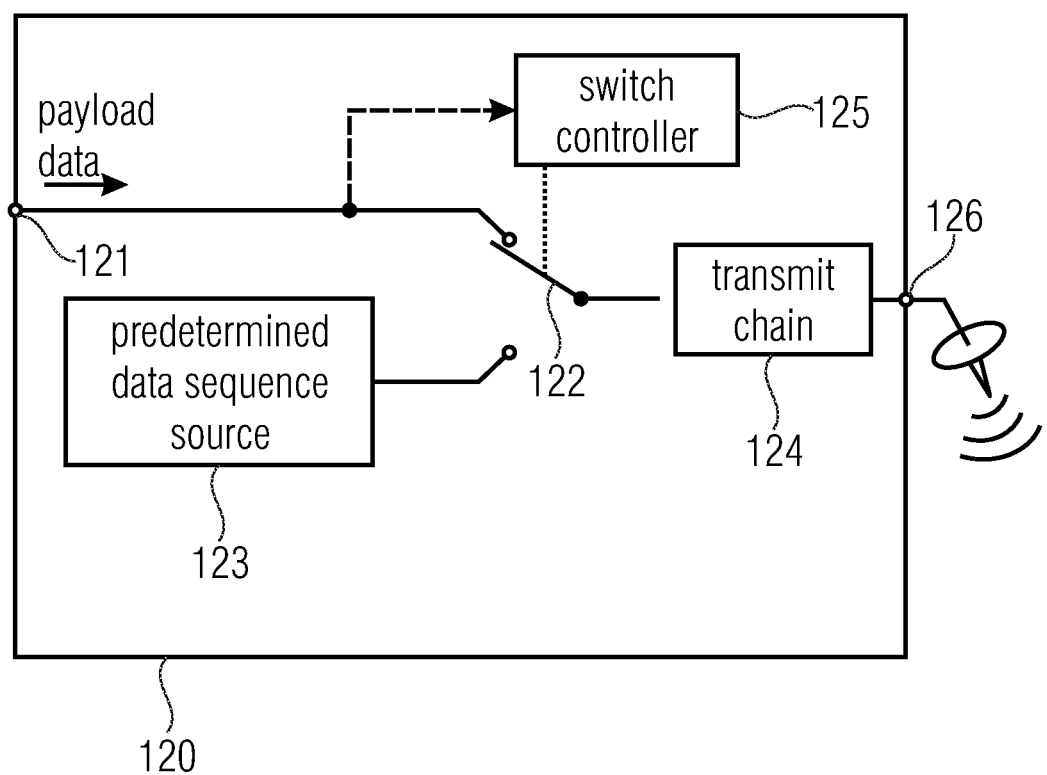
FIG. 7 shows a schematic block diagram of a further transmitter structure.

FIG. 7 shows another schematic block diagram of a transmitter 120 according to embodiments. The transmitter 120 comprises an input 121 for payload data. The payload data may be, for example, one or more bit streams comprising MPEG-coded (Moving Picture Experts Group) data. The input 121 is connected to the selector switch 122 already mentioned above in connection with the description of FIG. 6. The selector switch 122 is also connected to a data source 123 for providing one or more predetermined data sequence(s) (e.g., dummy data or pilots). The predetermined data sequence may comprise an identification of the transmitter 120. The selector switch further comprises a selector switch output. The selector switch 122 is configured to connect either the input 121 or the data source 123 with the selector switch output in response to a control signal received by the selector switch 122. In other words, at a given time one of the payload data and the predetermined data sequence is provided at the selector switch output. The control signal for the selector switch 122 is provided by a switch controller 125. The control signal is indicated in FIG. 7 by a dotted line. Hence, the switch controller is configured for controlling the selector switch to provide the predetermined data sequence at the selector switch output when no new payload data is available. The switch controller 125 may comprise an optional input that is connected to the payload data input 121. In this manner, the switch controller 125 may determine whether payload data to be transmitted is currently available at the input 121. For example, the switch controller 125 may comprise a payload data detector configured to detect whether new payload data is available at the input 121. Another option would be that the switch controller is aware of a recurring pattern within the payload data. Such information may be provided by, for example, a higher level system management.

The transmitter 120 further comprises a transmit chain 124 and an output 126. The transmit chain 124 is connected to the selector switch output of the selector switch 122. The transmit chain 124 is also connected to the output 126. The output 126 is further connected to an antenna. The transmit chain 124 receives the payload data sequence or the predetermined data sequence and generates a corresponding transmission signal to be transmitted via the antenna.

The predetermined data sequence typically has properties that allows the predetermined data sequence to be detected at a receiver in a relatively reliable manner, for example using correlation-based methods.

Figure 8:
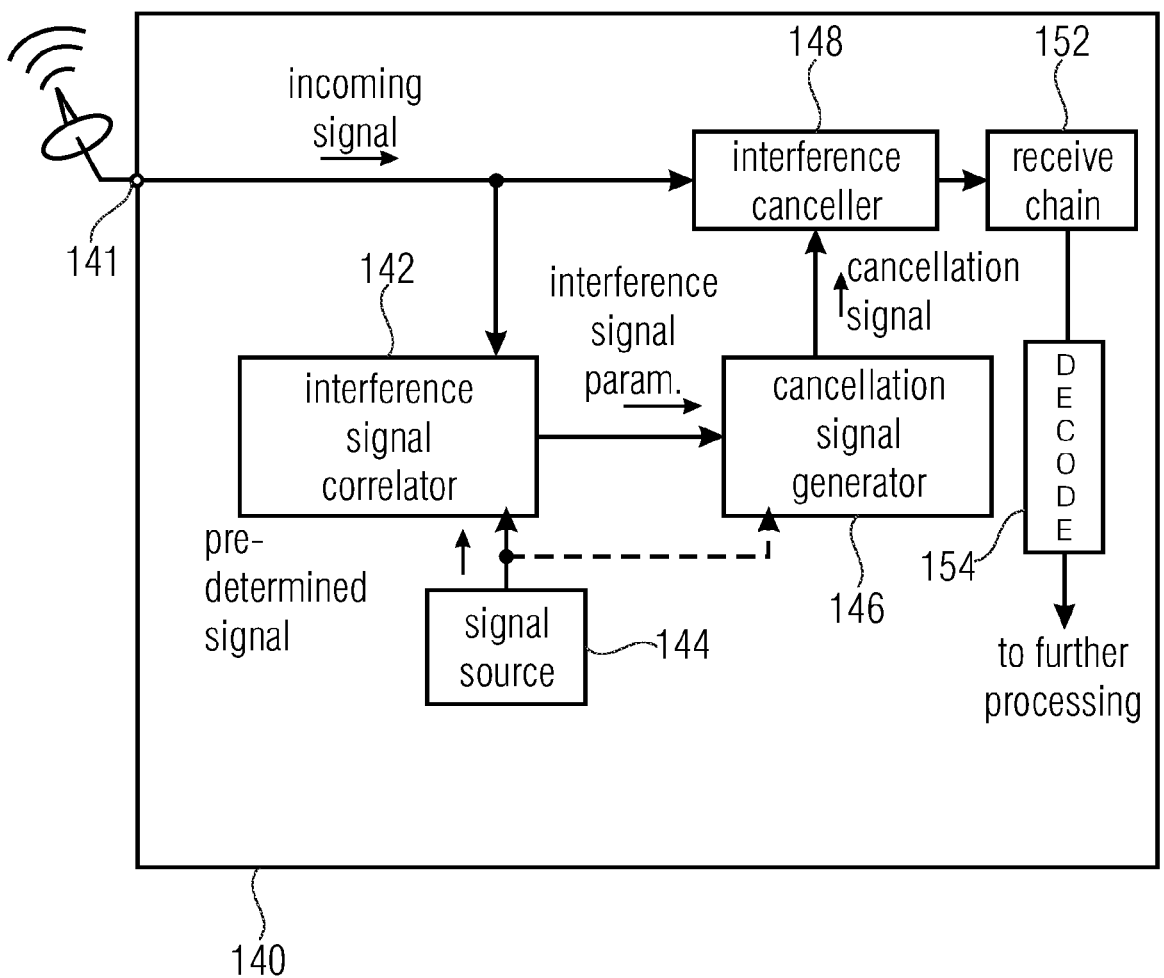
FIG. 8 shows a schematic block diagram of a receiver structure according to embodiments.

FIG. 8 shows a schematic block diagram of a receiver 140 according to embodiments. The receiver 140 comprises an input 141 which is connected to a receiving antenna. The receiving antenna provides an incoming signal that typically, i.e., during normal intended operation, comprises a wanted signal. Furthermore it may occur that the incoming signal also comprises one or more interference signals. The one or more interference signals may be relatively strong and therefore disturb the wanted signal. The one or more interference signals may be in substantially the same frequency band as the wanted signal.

The incoming signal is fed to an interference signal correlator 142 for performing a correlation of the incoming signal with a predetermined signal. The predetermined signal is generated by a signal source 144 and is associated to at least one of the interference signals. In particular, the predetermined signal is substantially identical to signal sections of the one or more interference signals that correspond to a predetermined data sequence transmitted by a corresponding transmitter of the interference signal. In other words, the signal source 144 is configured for providing the predetermined signal which is substantially identical to at least a portion of at least one interference signal or the one or more interference signals. At the transmitter side, the predetermined data sequences may be processed (e.g., digital-to-analog converted, frequency translated, etc.) into a predetermined signal and in this manner be transmitted by the corresponding transmitter whenever it does not have to transmit payload data. In addition or in the alternative, the predetermined data sequences may correspond to pilot signal sections within the interference signal. As the transmitter corresponding to the interference signal typically belongs to the same overall communication system or network as the receiver, the receiver knows the predetermined data sequence(s) and the corresponding predetermined signal. For example, the overall communication system or network may be a satellite television broadcasting system. The transmitter corresponding to the wanted signal is part of a first satellite and the transmitter corresponding to the interference signal is part of a second satellite. A receiver at the surface of the earth which receives both the wanted signal from the first satellite and the interference signal from the second satellite may be pre-configured to know the predetermined data sequences associated with the various transmitters at the various satellites. The receiver may thus detect the interference signal within the incoming signal and cancel the interference signal on the basis of the determined interference signal parameters. In embodiments, all potentially interfering sequences that are known could be stored in the receiver a priori. For example, the dummy frame sequence in DVB-S2 is known from the waveform a priori.

The signal correlator 142 is configured to analyze and/or compare the incoming signal with the predetermined signal in order to determine whether the incoming signal currently comprises the predetermined signal. A result of the analysis/comparison is provided, in the form of interference signal parameters, to a cancellation signal generator 146 of the receiver 140. The cancellation signal generator 146 is configured for generating a cancellation signal on the basis of the predetermined signal and the interference signal parameters. An optional connection may be provided between the signal source 144 and the cancellation signal generator 146 in order to provide the predetermined signal to the cancellation signal generator 146. The interference signal parameters may indicate, for example, a start time and/or an amplitude of the predetermined signal within the incoming signal. The cancellation signal generated by the cancellation signal generator 146 approximates the interference signal within the incoming signal so that a cancellation or at least a partial cancellation of the interference signal becomes possible.

The cancellation signal is provided to an interference canceller 148 which is configured for canceling the at least one interference signal by applying the cancellation signal to the incoming signal. For example, the interference signal may be combined with the incoming signal so that the interference signal portion within the incoming signal is destructively superposed with the cancellation signal. For example, the interference canceller 148 may be a signal combiner. An interference cancelled signal is provided at an output of the interference canceller.

The receiver 140 may further comprise an optional receive chain 152 and an optional decoder 154. The receive chain 152 receives the interference cancelled signal and performs, for example, a frequency translation (from radio frequency to baseband frequency) and/or an analog-to-digital conversion. The decoder 154 is configured for decoding the signal or data sequence provided by the receive chain 152. A decoded data sequence provided at an output of the decoder 154 may then be forwarded to downstream components for further processing.

The interference cancellation scheme according to embodiments relies on the interfering transmitters to transmit predetermined signal(s) at least occasionally. A cancellation of the interference can thus typically be achieved well as long as the interfering transmitters transmit the predetermined signal(s). At other times the interfering transmitters transmit payload data which is not known a-priori at the receiver. Hence, the interference cancellation according to the embodiments typically pauses during these time intervals. However, the wanted signal within the incoming signal may present some temporal redundancy for error correcting purposes (the same data or related data are distributed in time, for example, into different frames) that can be exploited to restore the wanted signal during the time intervals where the cancellation is paused. The same applies when the interferences are cancelled, but in this case, the necessitated redundancy in the wanted signal can be reduced, which increases the transmission rate of useful data information. In particular, a reception quality of the wanted signal may be relatively good during time intervals in which the interference cancellation is operative (i.e., the interference signal contains the predetermined signal). On the other hand, the reception quality of the wanted signal can be expected to be somewhat degraded during time intervals in which the interference cancellation is not operative (i.e., the interference signal does not contain the predetermined signal, or interference cancellation fails due to another reason). Exploiting the error correction capability of the received data, the average reception quality can be improved due to the performed interference cancellation.

For determining when the interference canceller shall pause, the received signal may be compared with the predetermined signal(s). When the correlation result is greater than a certain threshold it can be reasonably assumed that the received signal contains the predetermined signal so that interference cancellation should function sufficiently well. Therefore, the interference canceller is not paused when the predetermined signal is detected with a sufficiently high level within the received signal. In contrast, the interference canceler pauses when the correlation result indicates that the predetermined signal is not present within the received signal, or only to a very weak degree.

Regarding the temporal redundancy within the wanted signal, this may, for example, be achieved by interleaving techniques, for example, in connection with a digital video broadcasting system such as DVB-S or DVB-S2.

Another aspect to be considered in connection with embodiments disclosed herein is that in some environments and/or communication system architectures several interference signals from several different interfering transmitters may be received at the receiver. Cancelling the interference caused by at least one of the interfering transmitters is expected to already improve the reception quality of the wanted signal within the incoming signal. With several interfering transmitters it is more probable that at least one of these transmitters transmits its predetermined signal at a given time (even though others of the interfering transmitters do transmit payload data at the same time) so that interference cancellation may, in principle, be performed on the incoming signal, at least for one or some of the interference signals.

Figure 10:
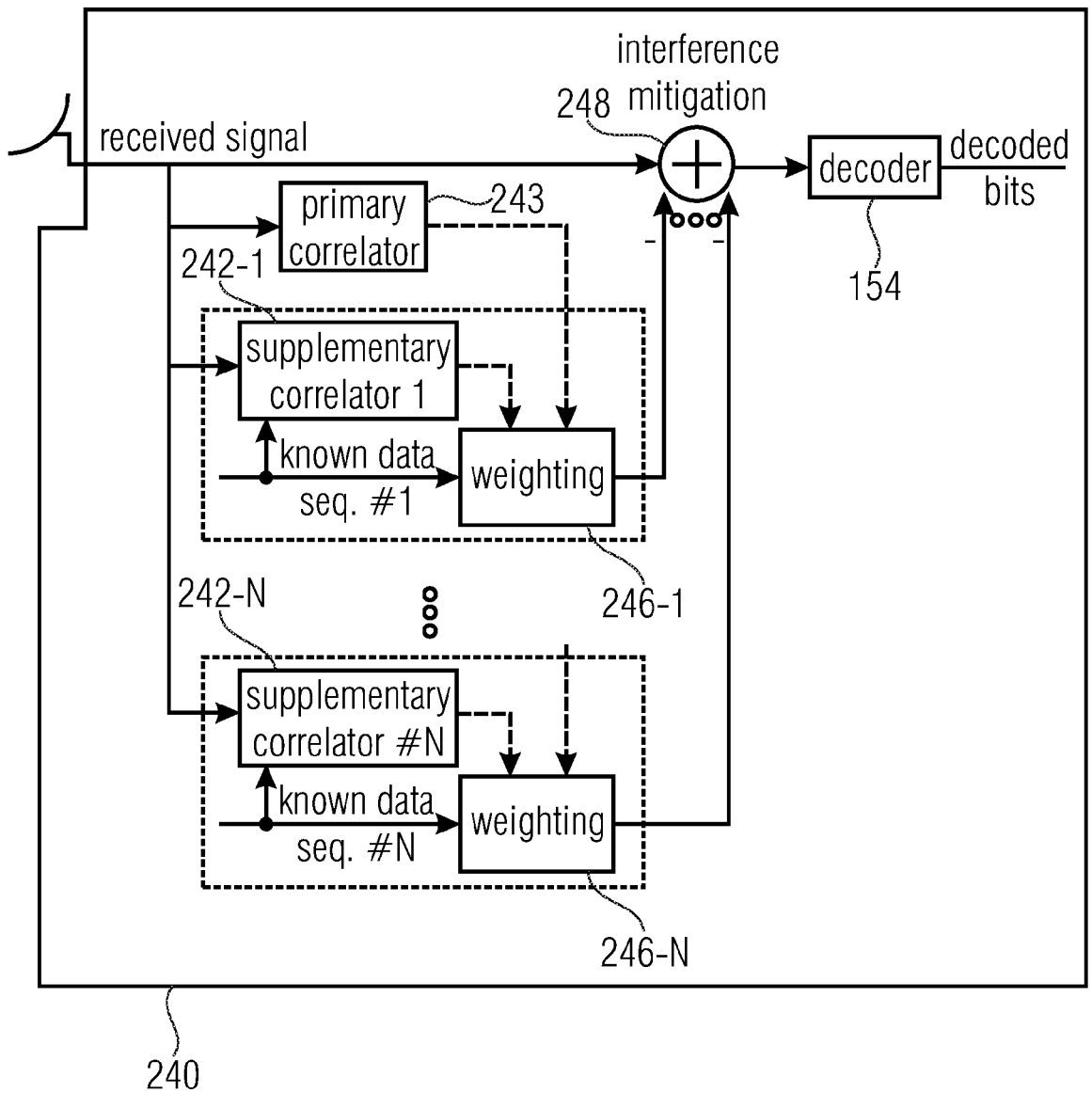
FIG. 10 shows a further schematic block diagram of a receiver structure according to embodiments.

In summary, even though in some embodiments only an intermittent interference cancellation of one specific interference signal may be achieved, the reception quality of the wanted signal may be improved to a degree that a subsequent decoding of the wanted signal performs better and, in many situations, a more reliable decoding can be achieved. This potential gain when using interference cancellation is depicted in FIG. 10, where a simulation result for different numbers of "dummy frames" interferences is shown. Six interference signals and a perfect interference cancellation are assumed. In case that all the interference beams send dummy frames, that means, no data communication is being performed in all the near beams using the same frequency, the gain is about 4.5 dB (for a C/N of 15 dB). However, if only one of the interference beams transmits dummy data, the gain is reduced to 0.5 dB (for a C/N of 15 dB).

Figure 9:
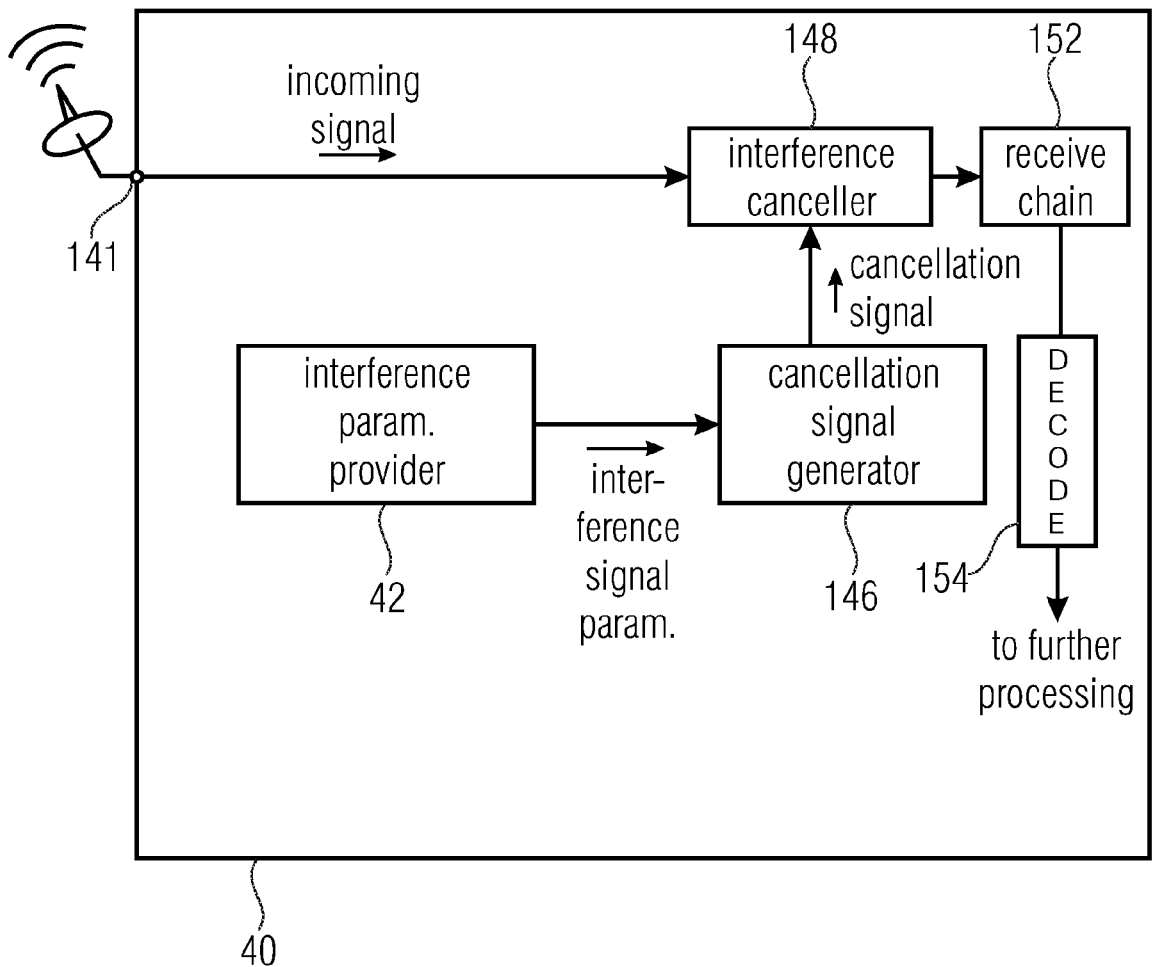
FIG. 9 shows a schematic block diagram of a receiver structure according to embodiments.

FIG. 9 shows a schematic block diagram of a receiver 40 according to embodiments. The receiver 40 comprises the input 141, the interference canceller 148, the cancellation signal generator 146, the receive chain 152, and the decoder 154. Reference is made to the description of FIG. 8 where these components of the receiver 40 have already been described. The receiver 40 differs from the receiver 140 of the embodiments of FIG. 8 in that the receiver 40 comprises an interference parameter provider 42. The signal source 144 and the interference signal correlator 142 may, in some embodiments, be components of the interference parameter provider 42. The interference parameter provider 42 may be regarded as a generalization of the concept illustrated in FIG. 8 according to which the interference signal parameter(s) is/are determined based on a correlation between the incoming signal and the predetermined signal. For example, the interference signal parameter(s) may be received via a network interface from a remote component such as a remote receiver. The remote receiver may be better located at a more optimal geographical location than the receiver 40 for determining the interference signal parameter(s). Another option for determining the interference signal parameters may be given in determining or measuring certain signal inherent properties. For example, a certain periodicity in the incoming signal may be exploited when determining the interference signal parameters. Such a periodicity may be caused, for example, by a repeating pilot pattern within the incoming signal. The repeating pilot pattern may be part of an interfering signal. The interference parameter provider 42 may be configured to receive the incoming signal or a signal derived from the incoming signal via a connection (not illustrated in FIG. 9) between the input 141 and the interference parameter provider 42.

FIG. 10 shows a schematic block diagram of a receiver 240 according to at least one other embodiment. The receiver 240 is configured for detecting and cancelling N different interfering signals. The receiver 240 comprises a primary correlator 243 and N supplementary correlators 242-1 to 242-N. Furthermore, the receiver 240 comprises N cancellation signal generators 246-1 to 246-N (labeled "weighting" in FIG. 10), wherein each cancellation signal generator 246-1 to 246-N is associated to one of the supplementary correlators 242-1 to 242-N.

The receiver 240 is configured for receiving an incoming signal from the antenna. The incoming signal (received signal) includes the wanted signal plus the interferers coming from the other beams (see FIG. 6). The primary correlator 243 is employed at the receiver 240 to estimate the channel parameters for the wanted signal. This primary correlator uses e.g. the known pilot sequence of the wanted signal as reference. Besides, additional N supplementary correlators 242-1 to 242-N (#1 to #N) work in parallel over the received signal, looking for known data sequences (e.g. dummy frames, pilots, known fields of the frame structure) transmitted by the interference beams. These additional correlators 242-1 to 242-N estimate the channel parameters for N potential interferers: these N channel parameter estimates are used, together with the channel parameters for the wanted signal in N channel correction blocks or cancellation signal generators 246-1 to 246-N, to derive N correction or cancellation signals. These N correction signals are then subtracted (248) from the received signal, to cancel interference. The resulting signal is then fed into the decoder block 154, to further demodulate and decode the signal.

At least some embodiments assume a communication system with several transmitters, each covering a certain area and non-perfect isolation between the areas. For example, such a communication system may be composed of a multi-spot beam satellite, using a M frequency re-use as shown in FIG. 1, and a number of receivers, each receiver being assigned to one of the spot beams. Each receiver is receiving both the wanted signal of the spot beam this receiver is assigned to as well as an aggregate of unwanted signals from other spot beams re-using the same frequency. For a given receiver in beam B, the received signal includes the wanted signal plus the interferers coming from the other beams. If data communication is taking place in beam B, the corresponding transmitter transmits data and pilot information (see FIG. 6, operation mode a), and corresponding description below). A primary correlator (FIG. 10) may be configured to estimate the channel parameters for the wanted signal in beam B. Besides, N supplementary correlators work in parallel over the received signal in order to look for known data sequences (dummy frames, pilots, known fields of the frame structure) expected in the interfering beams. For each interfering beam, the signal is either composed of data and pilots (FIG. 6, operation mode a), communication is taking place in the interfering beam) or the signal carries dummy frames (FIG. 6, operation mode b), no communication taking place in the interfering beam). This information is optionally embedded in a known stream or frame structure (e.g. the DVB-S2 frame structure of FIG. 5, with known SOF and PL Header fields). Each of the N supplementary correlators is configured to detect one of these a-priori known data sequences.

In case the interfering signal is strong enough and matches the known data sequence, the associated supplementary correlator will detect a match (e.g., by way of a correlation peak); this will provide channel parameters for this interfering beam. The complex-weighted known data sequence will then be subtracted from the received signal. Weighting will be performed based on the channel parameters (channel estimation) of the interfering beam and the channel parameters (channel estimation) of the wanted signal in beam B. This is performed in a way that minimizes the impact of the interfering signal onto the resulting signal when subtracting the detected and weighted known data sequence from the received signal. Complex weighting implies suitable amplitude scaling and phase rotation.

In case that the associated supplementary correlator will not find a peak value in a given interference beam the receiver has no information at that time about the interference coming from the considered beam, and the channel correction block sets the weighting to zero. Therefore, in this case the received signal remains unalterable and no interference cancellation is performed based on this associated correlator.

As shown in FIG. 10, N supplementary correlators work in parallel. As the known data sequences/signals coming from different beams are not necessarily identical or aligned in time the detection/correlation is performed independently for each potential interferer. Up to N interfering signals (from up to N interfering beams) can be canceled from the wanted signal before this wanted signal is further processed (demodulated and decoded).

Each of the N supplementary correlators is configured to detect one of the a-priori known data sequences. As N might be less than the number of possibly interfering beams and known data sequences, it is beneficial to configure the N supplementary correlators on a "best effort" basis, maximizing the probability of correlation match and/or maximizing the effectiveness of the interference cancellation.

Rules for configuring the N correlators on a "best effort" basis include (but are not limited to):
Cancellation of the dummy frame sequences from the N strongest (next neighbor) beams. The N strongest (next neighbor) beams can, for example, be derived from an initial or periodical scan through all potential interfering beams or from a-priory knowledge, e.g. known geographical beam layout and approximate power distribution.
Cancellation of periodical repeating sequences (e.g., pilot or header fields) from the N strongest (next neighbor) beams. This may include a prediction of the next occurrence of the periodically repeating sequence.

Prediction of the most likely interfering data sequence, e.g., by extrapolating from prior interference pattern or by monitoring beam loading.

As the interference levels are expected to be low due to the distance between the beams, the receiver has to use sufficient samples to guarantee accurate results. Thus it may be necessitated to run the correlation over multiple instances of the expected known data sequence. For example, when looking for dummy frames, a contiguous sequence of such frames may be necessitated for a reliable detection and to estimate the channel parameters of the interfering beam. This may be combined with different thresholds for switching between "detected" and "not detected" state in the correlator.

It may also be beneficial to operate a supplementary correlator in "gated mode", where the correlation is only done at discrete periods of time and the input signal is ignored for the remaining time. This applies, e.g., when looking for pilot fields that are intermixed with data.

Running N supplementary correlators is described as a parallel process using N dedicated supplementary correlator blocks. Alternatively a receiver can use only one correlator which first synchronizes to a first known data sequence. When found, this interference is cancelled and then the correlator looks for the next known data sequence/signal in the received data/signal. This implementation necessitates less complexity but it takes more time to cancel all the interferences.

Hence, according to embodiments, interferences are removed by employing known data sequences as dummy frames in the time period where the beams do not transmit useful payload data. These known sequences can be identified at the receiver and removed from the original signal. All the possibilities to do that at the receiver are covered by embodiments.

Instead of cancelling the interfering signal(s) from the wanted signal before this signal is further processed (demodulated and decoded), it is also possible to implement the interference cancellation as part of the demodulation and decoding process.

The disclosed embodiments may use one or more dummy data sequences to identify each beam. While one unique dummy sequence is sufficient to perform the interference cancellation as described before, the use of different dummy data sequences in each beam would additionally allow an identification of the interfering beam.

According to some embodiments the knowledge about the influence of near beams over each receiver may be exploited. The channel parameters can be measured for each interference beam independently (assuming, e.g., different dummy frame sequences for each beam or by detecting characteristic communication pattern). Therefore, the effect of each beam over the adjacent beams using the same frequency can be completely characterized. This information can be used by the higher layers (network management) to optimize the performance of the whole communication system. For example, the transmission power of a beam can be decreased or increased according to the impact onto the adjacent beams.

Figure 11:
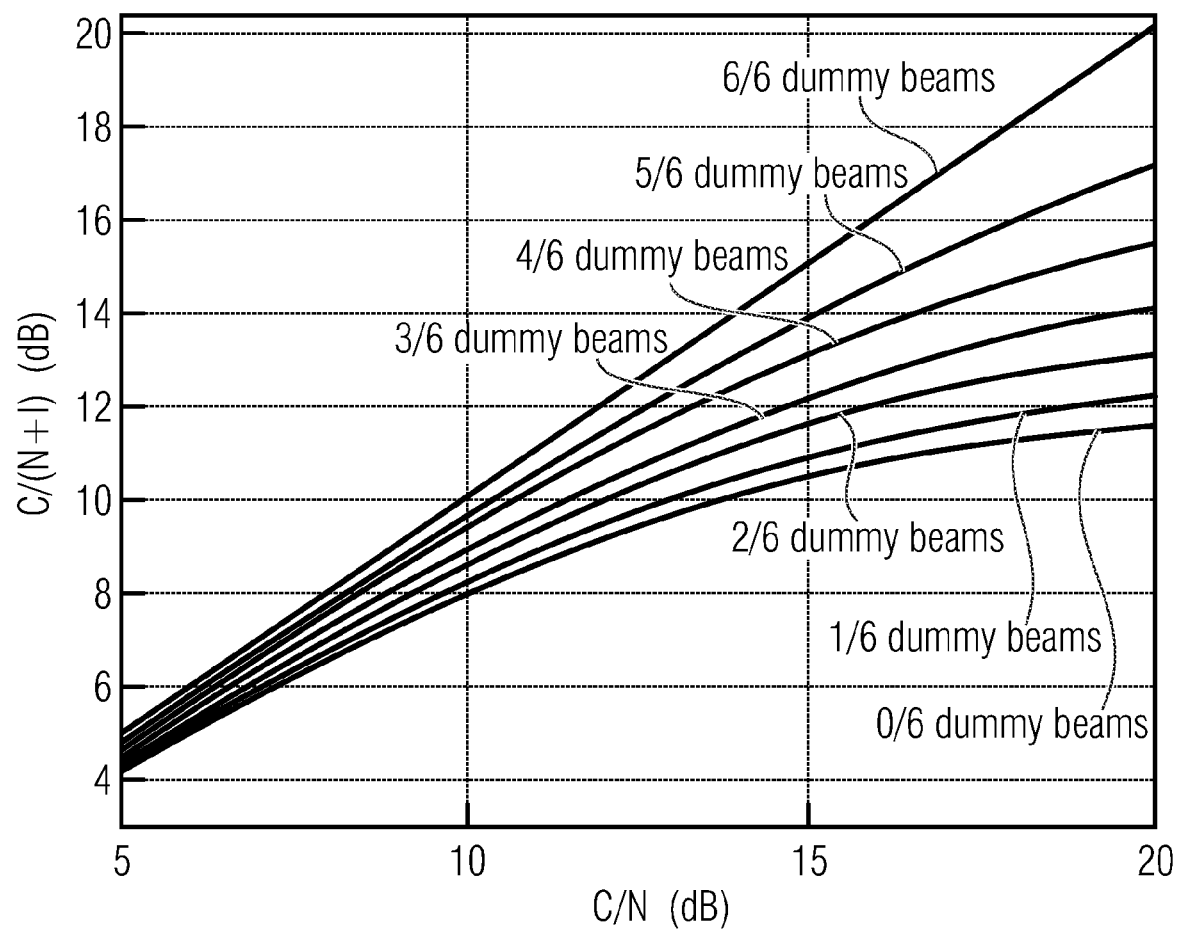
FIG. 11 shows a diagram of carrier-to-noise ratio over carrier-to-interference+noise-ratio for different ratios of interfering signals received and processed according to embodiments.

Some embodiments allow to eliminate the interference limitation of some communication systems. In systems with necessity of frequency re-use, the interference level between the transmitted signals could degrade the performance of the overall system. In this case a technique to cancel these interferences can increase the throughput and robustness of the system. The gain introduced by the interference cancellation strongly depends on the relation between the noise and interference level. If a system is clearly limited by the noise level, removing the interferences will not increase the system performance, but in presence of many and strong interferences, the improvement of cancelling these interferences is relevant (see FIG. 11). This leads to an increase in the transmission rate (higher throughput) and/or a higher robustness of the system against fading.

The cost of including the interference cancellation in a receiver in terms of complexity is limited, as only some extra correlators have to be added. That means, the complexity of the rest of the receiver can be still expected to dominate. Besides, if no known pattern is found in the received signal during the correlation process, nothing will be subtracted from the received signal. That means, the performance of the receiver will be at least as good as without interference cancellation. Therefore, no extra loss will be introduced by this method.

Note that most interference cancellation techniques typically necessitate some knowledge about the interference at the receiver side. In some scenarios a given receiver has absolutely no information about the interferences coming from other transmitters. In this case embodiments disclosed herein propose to use dummy frames when the interference transmitters are not active to be able to find the interference and cancel it. Alternatively, the receiver may be somehow informed about a known interference. One possible solution could be a communication between the receivers located in different beams, where a receiver which receives information (payload or dummy), could inform the other beams about that. For example, in the case of a satellite communication system a first receiver may be located in a first cell and a second receiver may be located in a second cell. The first cell is associated with a first beam emitted by a satellite. The second cell is associated with a second beam emitted by the same satellite or another satellite. The first receiver may determine detection and/or channel parameter information of the first beam, in particular the wanted signal that is contained in the first beam and that the first receivers strives to receive. The detection and/or channel information parameter may be provided to the second receiver via an alternative communication path, e.g., a landline communications network, a terrestrial broadcasting system, or via a satellite link etc. For example, the first receiver may be a central receiver that provides the detection and/or channel information parameter information via a fiber optic link or a packet-switched network to a remote terrestrial transmitter within or near the second cell. The terrestrial transmitter transmits the detection and/or channel parameter information to a plurality of second receivers within the second cell. Other configurations are also imaginable. The first and second receiver may also mutually exchange their detection and/or channel parameter information. Note that the amount of data associated with the detection and/or channel parameter information may be substantially smaller than an amount of data associated with the wanted signal. Therefore, the alternative communication path between the first and second receivers may have a relatively small bandwidth or capacity. According to another example where the detection and/or channel information parameter(s) may be provided via a satellite link, the first receiver could transmit the information via a satellite return link to a central gateway. Typically, such a satellite return link is anyway in place in a bidirectional satellite system. The central gateway in turn transmits the information via a satellite forward link to the second receiver.

Embodiments improve a receiver's performance in the presence of known interference pattern by detecting such pattern and by subtracting the property weighted pattern from the received signal, before further demodulation and decoding. Thus it is characteristic for the invention to only be effective for a limited set of fixed interference patterns and, e.g., not in the presence of random interfering signals. This property can be used to differentiate receivers using the described invention from other (outside the disclosed and/or proposed embodiments) interference suppression or cancellation techniques.

As a test, a receiver may be confronted with a signal that is overlaid with different interfering signal patterns. The receiver's performance may then be measured (e.g. output bit error rate) and compared with the expected performance under the given signal and interference levels. If the receiver performs better than expected (i.e., than a receiver that does not use interference cancellation/mitigation techniques), it can be concluded that some type of interference cancellation or mitigation technique is employed (including techniques outside embodiments disclosed herein). Assuming the receiver performs better for known or otherwise predictable interfering signal patterns (but not for unexpected variations of such patterns), it can be concluded that means for detecting such a-priori known sequences are implemented in the receiver. Furthermore, it can then be concluded that the receiver employs interference cancellation/mitigation based on detecting such a-priori sequences prior or as part of the demodulation and decoding process.

Figure 12:
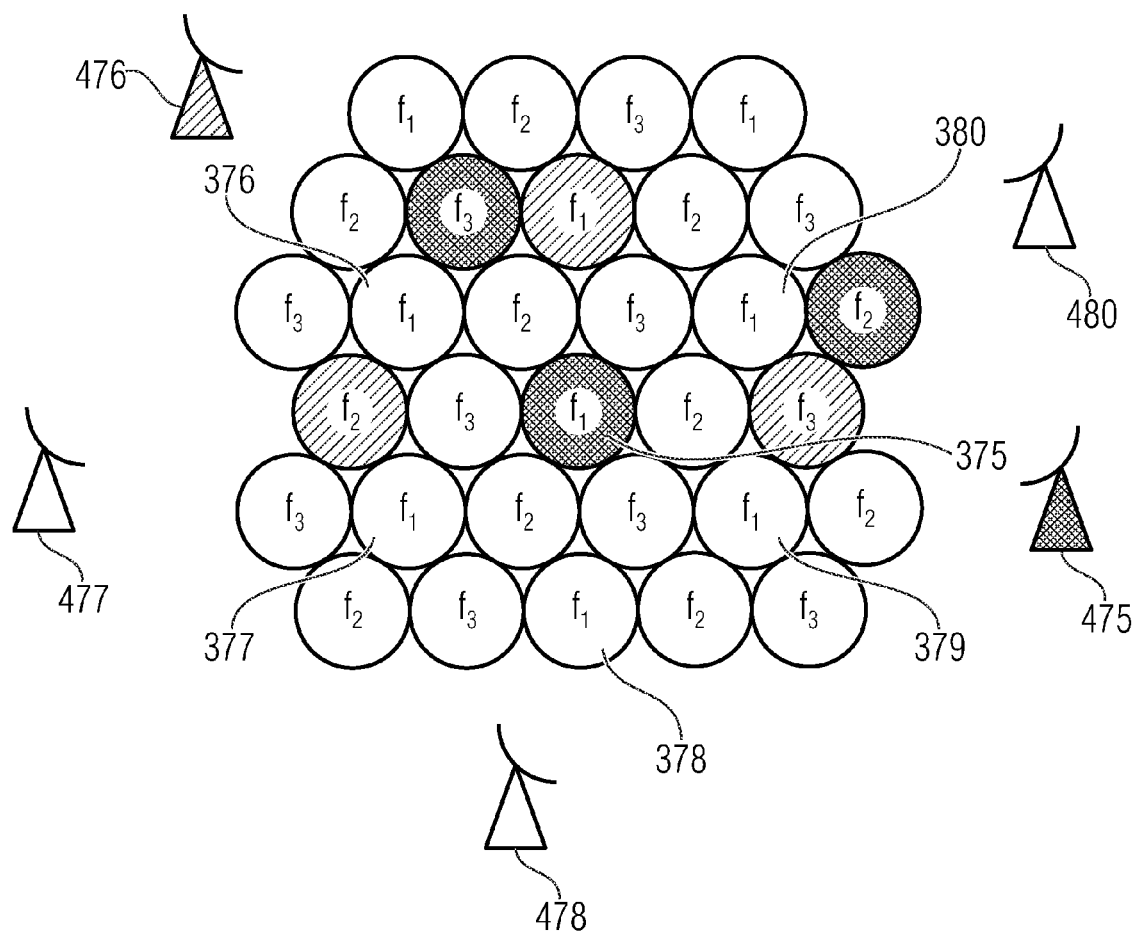
FIG. 12 schematically shows a communication system with independent interference sources.

Embodiments disclosed herein may be used in a large number of use cases. One of the primary use cases refers to satellite communications where a mixed cell structure coming from different transmitters is assumed. FIG. 12 shows an example of such a structure.

Let us consider the beam 375 and frequency f1. This beam 375 is receiving interferences from at least, the beams 376, 377, 378, 379, 380 which work at the same frequency f1. Note that these interference beams 376, 377, 378, 379, 380 are managed by other gateways 476, 477, 478, 480, which have no contact with the gateway 475 of the wanted signal. Therefore, the gateway 475 cannot inform a receiver located in the beam 375 (f1) about interferences from other beams. In other words, all other beams 376, 377, 378, 379, 380 working at the same frequency can be considered as interference sources. The addition of all the nearby interferences can degrade the quality of the received signal at the considered beam 375. The load of a communication system is usually much lower than the total capacity, which means there will be many time slots where the interference beams are in idle state. In these moments, dummy frames can be transmitted, which enables interference cancellation in the nearby beams.

Figure 13:
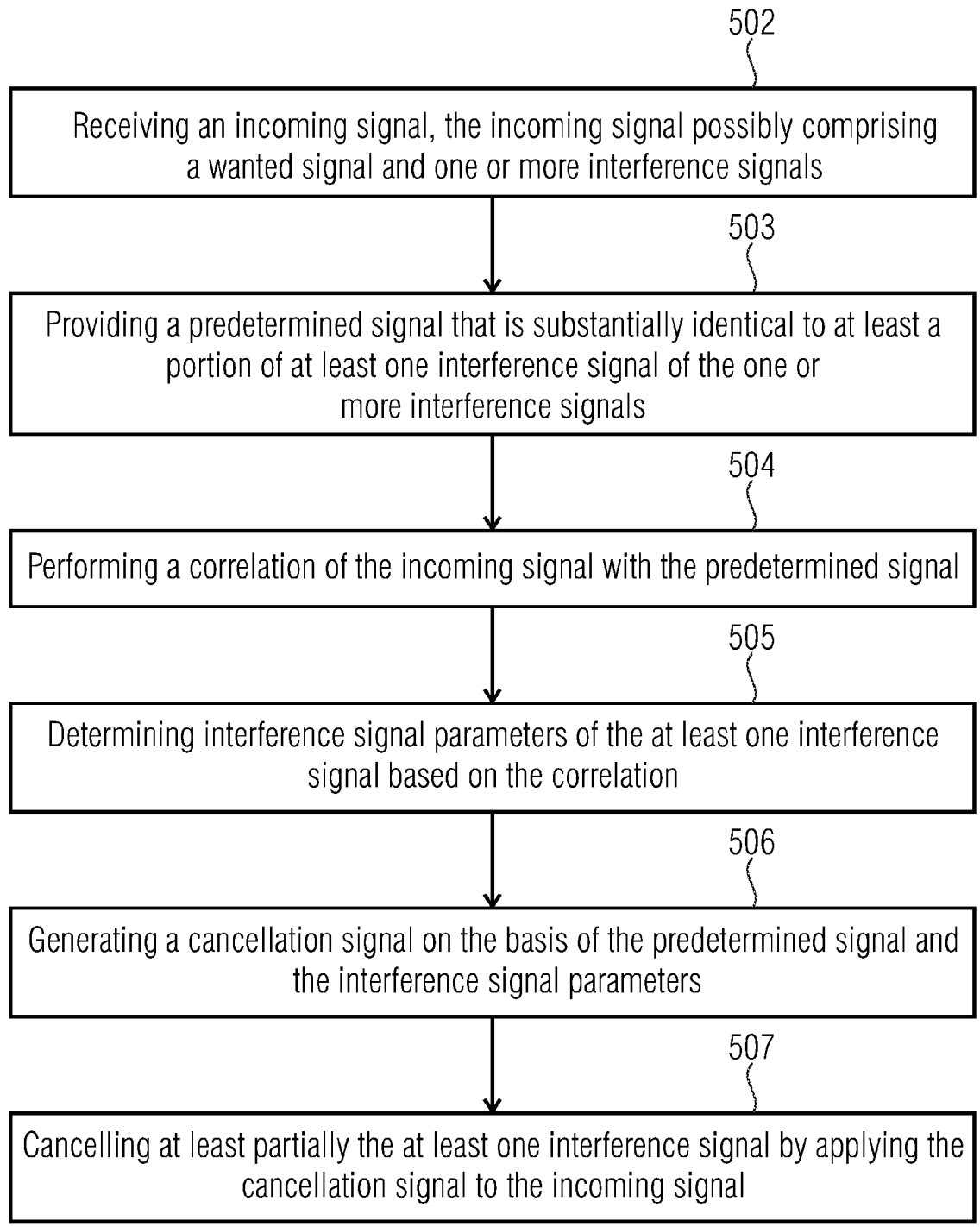
FIG. 13 shows a schematic flow diagram of a method for interference cancellation according to embodiments.

Further embodiments of the present invention provide a method for interference cancellation at a receiver. A schematic flow diagram of the method is shown in FIG. 13. The method comprises receiving an incoming signal at step 502, the incoming signal possibly comprising a wanted signal and one or more interference signals. The method further comprises an action 503 of providing a predetermined signal that is substantially identical to at least a portion of at least one interference signal of the one or more interference signals.

In the context of an action 504 of the method for interference cancellation a correlation of the incoming signal with the predetermined signal is performed. The method further comprises determining interference signal parameters of the at least one interference signal based on the correlation, as can be seen at an action 505. At an action 506 of the method a cancellation signal is generated on the basis of the predetermined signal and the interference signal parameters. The method also comprises cancelling at least partially the at least one interference signal by applying the cancellation signal to the incoming signal, at an action 507 of the method.

The method may further comprise an action of detecting whether new payload data is available at the input for payload data.

The predetermined data sequence may comprise an identification of the transmitter.

The method may further comprise an action of performing, e.g. by means of a primary correlator, a correlation of the incoming signal with pilot signals of the wanted signal and determining wanted signal parameters of the wanted signal based on the correlation. The wanted signal parameters may be provided to the interference correlator to be used for the correlation of the incoming signal with the predetermined signal.

The method may further comprise an action of determining and applying weighting parameters for the cancellation signal.

The portion of the at least one interference signal may correspond to predetermined dummy data inserted into the interference signal by an associated interfering transmitter when the interfering transmitter has no payload data to transmit.

The action of generating the interference cancellation signal may comprise predicting the interference signal when a correlation result of the correlation of the incoming signal and the predetermined signal is below a threshold.

The at least one interference signal may have a frame structure comprising a-priori known data fields and varying data fields. The varying data fields may contain payload data and a-priori known interference indicator data. The method may comprise a further action of using the a-priori known data fields and the a-priori known interference indicator data in the varying data fields for determining the interference signal parameters. In particular, the varying data fields may contain the a-priori interference indicator data when no payload data was currently available at a transmitter side of the data communication.

This disclosed embodiments can be extended to any communication system with a cell structure with frequency reuse, involving different transmitters which transmit known data sequences at some point in the data stream.

Moreover, some embodiments relate to a communication system comprising a plurality of transmitters and a receiver. The receiver may be currently configured to receive a signal from one of the transmitters. The other transmitters of the plurality of transmitters may cause interference at the receiver. Each of the transmitters transmits a predetermined signal or data sequence in an intermittent or recurring manner, for example in alternation with payload data to be transmitted. The receiver knows the predetermined signal(s) (in other words, the predetermined signal(s) is or are known to the receiver), for example, via of a receiver configuration, as part of a receiver firmware, being hardcoded in the receiver, or another suitable manner. The receiver may be implemented as described in this document. The communication system may be a bi- or unidirectional communication system and/or a broadcasting system. In particular, the communication system may be a satellite communication system or a satellite broadcasting system.

Figure 14:
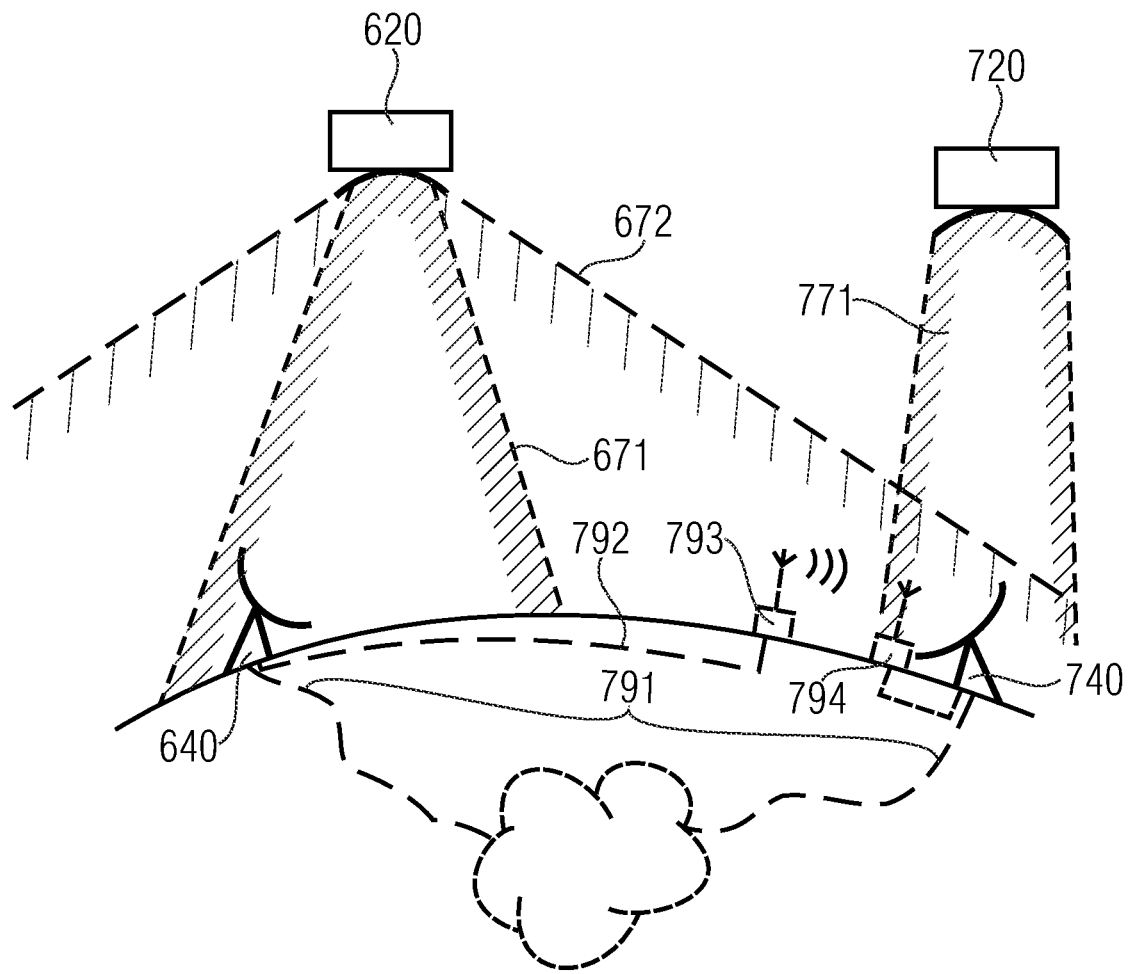
FIG. 14 shows a schematic block diagram of a communication system according to embodiments.

FIG. 14 shows a schematic block diagram of a communication system according to embodiments. Without loss of generality the communication system is assumed to comprise at least two transmitters 620 and 720 and two receivers 640, 740. Associated with the first transmitter 720 is a first coverage area served by a first main beam 771. A first receiver 740 is located within the coverage area served by the first main beam 771. Associated with the second transmitter 620 is a second coverage area served by a second main beam 671. The signal transmitted by the second transmitter 620 is also receivable (typically at a weaker signal level) within a wider (geographical) area served by a secondary beam 672 associated with the second transmitter 620. The location of the first receiver 740 falls within this wider area so that the first receiver 740 typically receives at least an attenuated version of the signal transmitted by the second transmitter 620, which may act as an interfering signal for the first receiver 740. However, within the coverage area of the second transmitter 620, the signal transmitted by the second transmitter is typically relatively strong and may thus be detected relatively easily by the second receiver 640 (at least better than by the first receiver which is not within the coverage area of the first transmitter). The second receiver 640 is configured to determine signal parameters of the signal transmitted by the second transmitter 620 and to transmit these signal parameters to the first receiver 740 via a communication path. FIG. 14 illustrates two options for the communication path (shown dashed in FIG. 14) which may be provided as alternatives or in combination. The communication path may comprise a network link 791 or, in the alternative, a terrestrial wireless communication path 792, 793, 794. The terrestrial wireless communication path may, for example, comprise a cable connection 792 between the second receiver 640 and a terrestrial wireless transmitter 793. The terrestrial wireless communication path further comprises a terrestrial wireless receiver 794 which is connected to the first receiver 740. Another option would be to transmit the signal parameters via a satellite return link from the second receiver 640 (in this case acting as a transmitter) to a satellite (e.g., the second transmitter 620, acting as a receiver). The signal parameters may be forwarded from the satellite to the first receiver 740, possibly using a central gateway and the first transmitter 720. Other options for the communication path are also possible and conceivable.

In the communication system shown in FIG. 14, the second receiver 640 determines, transmits, and provides interference signal parameters for the first receiver 740. Of course, it is also possible that the first receiver 740 determines interference signal parameters to be used by the second receiver 640. In other words, the payload signal received at a first location is evaluated to determine interference signal parameters for a second location at which said payload signal acts as an interfering signal.

The interference signal provider 42 of the receiver 40 may be configured to adjust or modify the interference signal parameters in order to account for a difference between the contemplated signal as it is received at the remote receiver and as it received at the local receiver. Such difference may be due to the spatial and/or geographical distance between the remote receiver and the local receiver. The difference may be a priori known because the relative locations of the remote receiver, the local receiver, and the transmitter may be known, fixed, predetermined, and/or predictable. The difference may in particular be noticeable with respect to an amplitude and a phase of the contemplated signal as it is received at the remote and local receivers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

According to one aspect, a receiver comprises: an input for an incoming signal, the incoming signal possibly comprising a wanted signal and one or more interference signals; an interference parameter provider for providing interference signal parameters regarding at least one known signal component of at least one of the one or more interference signals; a cancellation signal generator for generating a cancellation signal on the basis of the interference signal parameters; and an interference canceller for at least partially cancelling the at least one interference signal by applying the cancellation signal to the incoming signal.

The interference parameter provider of the receiver may comprise: a signal source for providing a predetermined signal that is substantially identical to the at least one known signal component; and an interference signal correlator for performing a correlation of the incoming signal with the predetermined signal and for determining interference signal parameters of the at least one interference signal based on the correlation.

The cancellation signal generator of the receiver may be configured for receiving the predetermined signal to be used for generating the cancellation signal.

The receiver may further comprise a primary correlator for performing a correlation of the incoming signal with pilot signals of the wanted signal and for determining wanted signal parameters of the wanted signal based on the correlation, wherein the wanted signal parameters are provided to the interference correlator to be used for the correlation of the incoming signal with the predetermined signal.

The cancellation signal generator in the receiver may comprise a weighting unit for determining and applying weighting parameters for the cancellation signal.

In the receiver, the known signal component of the at least one interference signal may correspond to predetermined dummy data inserted into the interference signal by an associated interfering transmitter when the interfering transmitter has no payload data to transmit.

The signal source of the receiver may be configured for providing the predetermined signal on the basis of a predetermined data sequence.

According to a further aspect, the cancellation signal generator of the receiver may comprise a predictor for predicting the interference signal when a confidence for the at least one interference signal parameter determined by the interference signal parameter provider is below a threshold.

According to a further aspect, in the receiver, the at least one interference signal may have a frame structure comprising a-priori known data fields and varying data fields, the varying data fields containing payload data or a-priori known interference indicator data, wherein the interference parameter provider is configured for using the a-priori known data fields and the a-priori known interference indicator data in the varying data fields for determining the at least one interference signal parameter.

According to a further aspect, the interference parameter provider of the receiver may be configured for identifying the at least one interference signal by evaluating signal inherent properties of the at least one interference signal.

According to another aspect, a communication system comprises a transmitter and a receiver comprising an input for an incoming signal, the incoming signal possibly comprising a wanted signal and one or more interference signals; an interference parameter provider for providing interference signal parameters regarding at least one known signal component of at least one of the one or more interference signals; a cancellation signal generator for generating a cancellation signal on the basis of the interference signal parameters; and an interference canceller for at least partially cancelling the at least one interference signal by applying the cancellation signal to the incoming signal.

The communication system may further comprise a second receiver configured to transmit the interference signal parameters to the receiver via a communication path.

According to another aspect, a method for interference cancellation at a receiver comprises: receiving an incoming signal, the incoming signal possibly comprising a wanted signal and one or more interference signals; obtaining at least one interference signal parameter regarding at least one known signal component of at least one of the one or more interference signals; generating a cancellation signal on the basis of the at least one interference signal parameter; and cancelling at least partially the at least one interference signal by applying the cancellation signal to the incoming signal.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A receiver, comprising:
an input configured to receive an incoming signal, the incoming signal being capable of including a wanted signal and one or more interference signals, wherein the one or more interference signals include one or more predetermined signal at least occasionally;
an interference parameter provider configured to provide interference signal parameters regarding at least one known signal component of at least one of the one or more interference signals;
a cancellation signal generator configured to generate a cancellation signal according to the interference signal parameters; and
an interference canceller configured to at least partially cancel the one or more interference signals by applying the cancellation signal to the incoming signal; wherein
the interference canceller is configured to pause during time intervals in which the one or more interference signal includes data that is not a-priori known at the receiver; and
the interference parameter provider includes:
a signal source configured to provide a predetermined signal that is identical or substantially identical to the at least one known signal component; and
an interference signal correlator configured to perform a correlation of the incoming signal with the predetermined signal and configured to determine interference signal parameters of the at least one interference signal based on the correlation.

2. The receiver according to claim 1, wherein the cancellation signal generator is configured to receive the predetermined signal to be used to generate the cancellation signal.

3. The receiver according to claim 1, further comprising:
a primary correlator configured to perform a correlation of the incoming signal with pilot signals of the wanted signal and configured to determine wanted signal parameters of the wanted signal based on the correlation, wherein the wanted signal parameters are provided to the interference correlator to be used for the correlation of the incoming signal with the predetermined signal.

4. The receiver according to claim 1, wherein the cancellation signal generator includes a weighting unit configured to determine and apply weighting parameters for the cancellation signal.

5. The receiver according to claim 1, wherein the known signal component of the at least one interference signal corresponds to predetermined dummy data inserted into the interference signal by an associated interfering transmitter when the interfering transmitter does not include any payload data to be transmitted.

6. The receiver according to claim 1, wherein the signal source is configured to provide the predetermined signal according to a predetermined data sequence.

7. The receiver according to claim 1, wherein the cancellation signal generator includes a predictor configured to predict the interference signal when a confidence for the at least one interference signal parameter determined by the interference signal parameter is below a threshold.

8. The receiver according to claim 1, wherein:
the at least one interference signal includes a frame structure including a-priori known data fields and varying data fields, the varying data fields including payload data or a-priori known interference indicator data, and
the interference parameter provider is configured to use the a-priori known data fields and the a-priori known interference indicator data in the varying data fields to determine the at least one interference signal parameter.

9. The receiver according to claim 1, wherein the interference parameter provider is configured to identify the at least one interference signal by evaluating signal inherent properties of the at least one interference signal.

10. The receiver according to claim 1, wherein the wanted signal presents a temporal redundancy for error correcting that is used to restore the wanted signal during the time intervals when the cancellation is paused.

11. A communication system comprising a transmitter and a receiver according to claim 1.

12. The communication system according to claim 11, further comprising a second receiver configured to transmit the interference signal parameters to the receiver via a communication path.

13. A method for interference cancellation at a receiver, the method comprising:
receiving an incoming signal, the incoming signal being capable of including a wanted signal and one or more interference signals, wherein the one or more interference signals include one or more predetermined signal at least occasionally;
acquiring at least one interference signal parameter regarding at least one known signal component of at least one of the one or more interference signals;
generating a cancellation signal according to the at least one interference signal parameter; and
cancelling, at least partially, the one or more interference signals by applying the cancellation signal to the incoming signal; wherein
cancelling the one or more interference signals pauses during time intervals in which the one or more interference signal includes data that is not a-priori known at the receiver; and
wherein acquiring the interference parameter includes:
providing a predetermined signal that is identical or substantially identical to the at least one known signal component; and
performing a correlation of the incoming signal with the predetermined signal and determining interference signal parameters of the at least one interference signal based on the correlation.

14. The method according to claim 13, wherein generating the cancellation signal includes receiving the predetermined signal to be used to generate the cancellation signal.

15. The method according to claim 13, further comprising:
performing a correlation of the incoming signal with pilot signals of the wanted signal; and
determining wanted signal parameters of the wanted signal based on the correlation, wherein
the wanted signal parameters are used for the correlation of the incoming signal with the predetermined signal.

16. The method according to claim 13, wherein the generating the cancellation signal includes determining and applying weighting parameters for the cancellation signal.

17. The method according to claim 13, wherein the known signal component of the at least one interference signal corresponds to predetermined dummy data inserted into the interference signal by an associated interfering transmitter when the interfering transmitter does not include any payload data to be transmitted.

18. The method according to claim 13, further comprising:
providing the predetermined signal according to a predetermined data sequence.

19. The method according to claim 13, wherein generating the cancellation signal includes predicting the interference signal when a confidence for the at least one interference signal parameter determined by the interference signal parameter is below a threshold.

20. The method according to claim 13, wherein:
the at least one interference signal includes a frame structure including a-priori known data fields and varying data fields, the varying data fields including payload data or a-priori known interference indicator data, and
the providing the at least one interference parameter includes using the a-priori known data fields and the a-priori known interference indicator data in the varying data fields to determine the at least one interference signal parameter.

21. The method according to claim 13, wherein providing the at least one interference parameter includes identifying the at least one interference signal by evaluating signal inherent properties of the at least one interference signal.

22. The method according to claim 13, wherein the wanted signal presents a temporal redundancy for error correcting that is used to restore the wanted signal during the time intervals when the cancellation is paused.

23. A non-transitory computer-readable medium including a computer program for performing, when the computer program is executed on a computer, the method according to claim 13.

* * * * *

UNITED STATES PATENT AND TRADEMARK OFFICE
CERTIFICATE OF CORRECTION

PATENT NO. : 9,124,336 B2
APPLICATION NO. : 14/471202
DATED : September 1, 2015
INVENTOR(S) : Martin Leyh et al.

Page 1 of 1

It is certified that error appears in the above-identified patent and that said Letters Patent is hereby corrected as shown below:

The following should be corrected for the third inventor in item (72) on the Title page of the Patent:

"Michael SCHLICHT, Seligenporten (DE);"

Signed and Sealed this
Twelfth Day of July, 2016

Michelle K. Lee
*Director of the United States Patent and Trademark Office*